(12) United States Patent
Doi

(10) Patent No.: US 11,238,320 B2
(45) Date of Patent: Feb. 1, 2022

(54) PRINTING APPARATUS AND PRINTING METHOD

(71) Applicant: SEIKO EPSON CORPORATION, Tokyo (JP)

(72) Inventor: Takashi Doi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/920,038

(22) Filed: Jul. 2, 2020

(65) Prior Publication Data

US 2020/0334505 A1 Oct. 22, 2020

Related U.S. Application Data

(63) Continuation of application No. 16/271,313, filed on Feb. 8, 2019, now Pat. No. 10,740,662.

(30) Foreign Application Priority Data

Feb. 9, 2018 (JP) .............................. JP2018-021538

(51) Int. Cl.
| | |
|---|---|
| *G06K 15/10* | (2006.01) |
| *B41J 2/15* | (2006.01) |
| *B41J 2/045* | (2006.01) |
| *B41J 2/21* | (2006.01) |
| *B41J 2/155* | (2006.01) |

(52) U.S. Cl.
CPC ........ *G06K 15/107* (2013.01); *B41J 2/04581* (2013.01); *B41J 2/15* (2013.01); *B41J 2/155* (2013.01); *B41J 2/2103* (2013.01); *B41J 2/2132* (2013.01)

(58) Field of Classification Search
CPC ....... B41J 2/15; B41J 2/045; B41J 2/21; B41J 2/155; G06K 15/107
See application file for complete search history.

(56) References Cited

U.S. PATENT DOCUMENTS

| | | |
|---|---|---|
| 2015/0054869 A1 | 2/2015 | Miyamoto et al. |
| 2017/0282550 A1 | 10/2017 | Suzuki et al. |
| 2018/0201016 A1 | 7/2018 | Suzuki et al. |

FOREIGN PATENT DOCUMENTS

| | | |
|---|---|---|
| JP | 2015-150828 A | 8/2015 |
| JP | 2017177666 A | 10/2017 |

*Primary Examiner* — Julian D Huffman
(74) *Attorney, Agent, or Firm* — Chip Law Group

(57) ABSTRACT

In a printing chip overlapping area being an area in which a first printing chip and a second printing chip overlap with each other when viewed from a second direction, ink is discharged so that a first overlapping area and a second overlapping area at least partially do not overlap with each other when viewed from the second direction. In the first overlapping area, a nozzle usage ratio of a first nozzle row and a nozzle usage ratio of a third nozzle row are neither 0% nor 100%. In the second overlapping area, a nozzle usage ratio of a second nozzle row and a nozzle usage ratio of a fourth nozzle row are neither 0% nor 100%.

4 Claims, 9 Drawing Sheets

PRINTING APPARATUS AND PRINTING METHOD

BACKGROUND

1. Technical Field

The invention relates to a printing apparatus.

2. Related Art

Recent years, as a printing apparatus, an ink jet-type printer including printing chips has been used. The printing chips are obtained by chipping an ink discharge mechanism including a piezoelectric element, an ink chamber, and a nozzle through application of a semiconductor processing technique. Each printing chip includes a plurality of nozzle rows arrayed along a conveyance direction of a printing medium. In a structure in which the plurality of printing chips are mounted on one printing head, ends of the plurality of printing chips adjacent to each other in a main scanning direction are arranged to overlap with each other when viewed from the main scanning direction in some cases. In an area in which the ends of the printing chips overlap with each other, ink is discharged from nozzle rows of the printing chips so that a nozzle usage ratio between the nozzle rows arranged on one printing chip and the nozzle rows arranged on another printing chip is 100%. In this manner, a raster of the area is formed (for example, JP-A-2015-150828).

However, in JP-A-2015-150828, in the area in which the ends of the printing chips overlap with each other (hereinafter, referred to as "printing chip overlapping area"), the nozzle rows on the same printing chip are arranged substantially at the same positions as each other when viewed from the main scanning direction. Thus, when landing positions of ink droplets are deviated, such landing position deviation is simultaneously caused to the plurality of nozzle rows in the printing chip overlapping area. Accordingly, uneven density may possibly notably appear in a printing image. Further, in JP-A-2015-150828, the nozzle rows of each printing chip discharge the same color ink as each other. A nozzle group discharging ink simultaneously is positioned in each nozzle row in an area (hereinafter, referred to as "ink discharge area"). Such ink discharge areas are substantially at the same positions as each other when viewed from the main scanning direction. With this structure, also in a case where landing position deviation of ink droplets is caused due to variation of an ink discharge amount and an ink discharge speed and the like caused by a drive frequency difference among the nozzles, the landing position deviation is caused in the ink discharge areas at the same time. Accordingly, uneven density may further be noticeable in a printing image. Therefore, a technology for suppressing degradation of printing image quality in the printing chip overlapping areas in the printing image is desired.

SUMMARY

The invention has been made to address at least some of the above-described issues and can be achieved as the following embodiments.

(1) According to an exemplary embodiment of the invention, a printing apparatus is provided. The printing apparatus is a printing apparatus for performing printing on a medium, the printing apparatus including a printing head including a first printing chip and a second printing chip, which are arranged to at least partially overlap with each other when viewed from a second direction, the first printing chip including a first nozzle row and a second nozzle row, which are away from each other in the second direction intersecting a first direction, the first nozzle row and the second nozzle row including a plurality of nozzles arrayed in the first direction for discharging ink onto the medium, the second printing chip including a third nozzle row and a fourth nozzle row, which are away from each other in the second direction, the third nozzle row and the fourth nozzle row including a plurality of nozzles arrayed in the first direction for discharging the ink onto the medium, a conveyance unit configured to convey the medium relatively to the printing head, and a printing control unit configured to cause the printing head to discharge the ink onto the medium, based on a nozzle usage ratio being a ratio of the ink discharged from each of the plurality of nozzles. The first nozzle row and the third nozzle row are configured to discharge the ink of the same color, the second nozzle row and the fourth nozzle row are configured to discharge the ink of the same color, and the printing control unit is configured to cause the ink to be discharged so that a first overlapping area and a second overlapping area are at least partially prevented from overlapping with each other when viewed from the second direction in a printing chip overlapping area, the first overlapping area being an area in which the nozzle usage ratio of the first nozzle row and the nozzle usage ratio of the third nozzle row are not 0% or 100%, the second overlapping area being an area in which the nozzle usage ratio of the second nozzle row and the nozzle usage ratio of the fourth nozzle row are not 0% or 100%, and the printing chip overlapping area being an area in which the first printing chip and the second printing chip overlap with each other when viewed from the second direction.

With the printing apparatus according to the above-mentioned aspect, in the printing chip overlapping area being the area in which the first printing chip and the second printing chip overlap with each other when viewed from the second direction, the ink is discharged so that the first overlapping area being the area in which the nozzle usage ratio of the first nozzle row and the nozzle usage ratio of the third nozzle row are neither 0% nor 100% and the second overlapping area being the area in which the nozzle usage ratio of the second nozzle row and the nozzle usage ratio of the fourth nozzle row are neither 0% nor 100% at least partially do not overlap with each other when viewed from the second direction. Thus, in a case where landing position deviation of ink droplets is caused both in the first overlapping area and the second overlapping area, the areas in which landing position deviation is caused in the second direction are dispersed so that uneven density is prevented from appearing in an overlapping manner in the second direction in the printing image. In this manner, degradation of the printing image quality in the printing chip overlapping area can be suppressed.

(2) In the printing apparatus according to the above-mentioned aspect, the printing control unit may be configured to, in the printing chip overlapping area, cause the ink to be discharged so that the first overlapping area and the second overlapping area are prevented from overlapping with each other when viewed from the second direction. With the printing apparatus according to the above-mentioned aspect, in the printing chip overlapping area, the ink is discharged so that the first overlapping area and the second overlapping are do not overlap with each other in the second direction. Thus, in a case where landing position deviation of ink droplets is caused both in the first overlapping area and the second overlapping area, the areas in which landing position deviation is caused in the second direction do not overlap with each other so that uneven density is prevented from appearing in an overlapping manner in the second direction in the printing image. In this manner, degradation of the printing image quality in the printing chip overlapping area can be suppressed.

(3) The printing apparatus according to the above-mentioned aspect may be configured such that the printing head includes two or more printing chips including the first printing chip and the second printing chip, the first nozzle row and the third nozzle row are configured to discharge ink of black, the second nozzle row and the fourth nozzle row are configured to discharge ink of yellow, the two or more printing chips further include a fifth nozzle row and a sixth nozzle row being different from the first nozzle row to the fourth nozzle row, in which a plurality of nozzles for discharging ink of the same color other than black and yellow are arrayed in the first direction, the fifth nozzle row and the sixth nozzle row are arranged away from each other in the second direction, and the printing control unit is configured to cause the ink to be discharged so that the first overlapping area and the second overlapping area at least partially overlap with each other when viewed from the second direction in the printing chip overlapping area.

With the printing apparatus according to the above-mentioned aspect, in the printing chip overlapping area, the ink is discharged so that the first overlapping area and the second overlapping area at least partially overlap with each other when viewed from the second direction. Thus, as compared to the configuration in which the ink is discharged so that the first overlapping area and the second overlapping are do not overlap with each other when viewed from the second direction, the overlapping areas of the colors other than black and yellow can be arranged at the positions away from the first overlapping area and the second overlapping area in the first direction. Further, in a case where ink of a plurality of colors other than black and yellow is used, there can be secured areas (nozzle groups) in which overlapping areas of colors other than black and yellow do not overlap with each other when viewed from the second direction. Additionally, the printing apparatus can be reduced in size.

(4) In the printing apparatus according to the above-mentioned aspect, the printing control unit may cause the ink to be discharged so that the first overlapping area and the second overlapping area completely overlap with each other when viewed from the second direction. With the printing apparatus according to the above-mentioned aspect, the ink is discharged so that the first overlapping area and the second overlapping area completely overlap with each other when viewed from the second direction. Thus, as compared to the configuration in which the ink is discharged so that the first overlapping area and the second overlapping area overlap with each other when viewed from the second direction, in the printing chip overlapping area, the overlapping areas of the same color other than black and yellow can be arranged away from each other in the first direction.

The invention may be achieved in various embodiments. For example, the invention may be achieved in embodiments including a printing method in the printing device, a computer program for achieving the printing method, and a recording medium for storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Exemplary Embodiment

A1. Device Configuration

Figure 1:
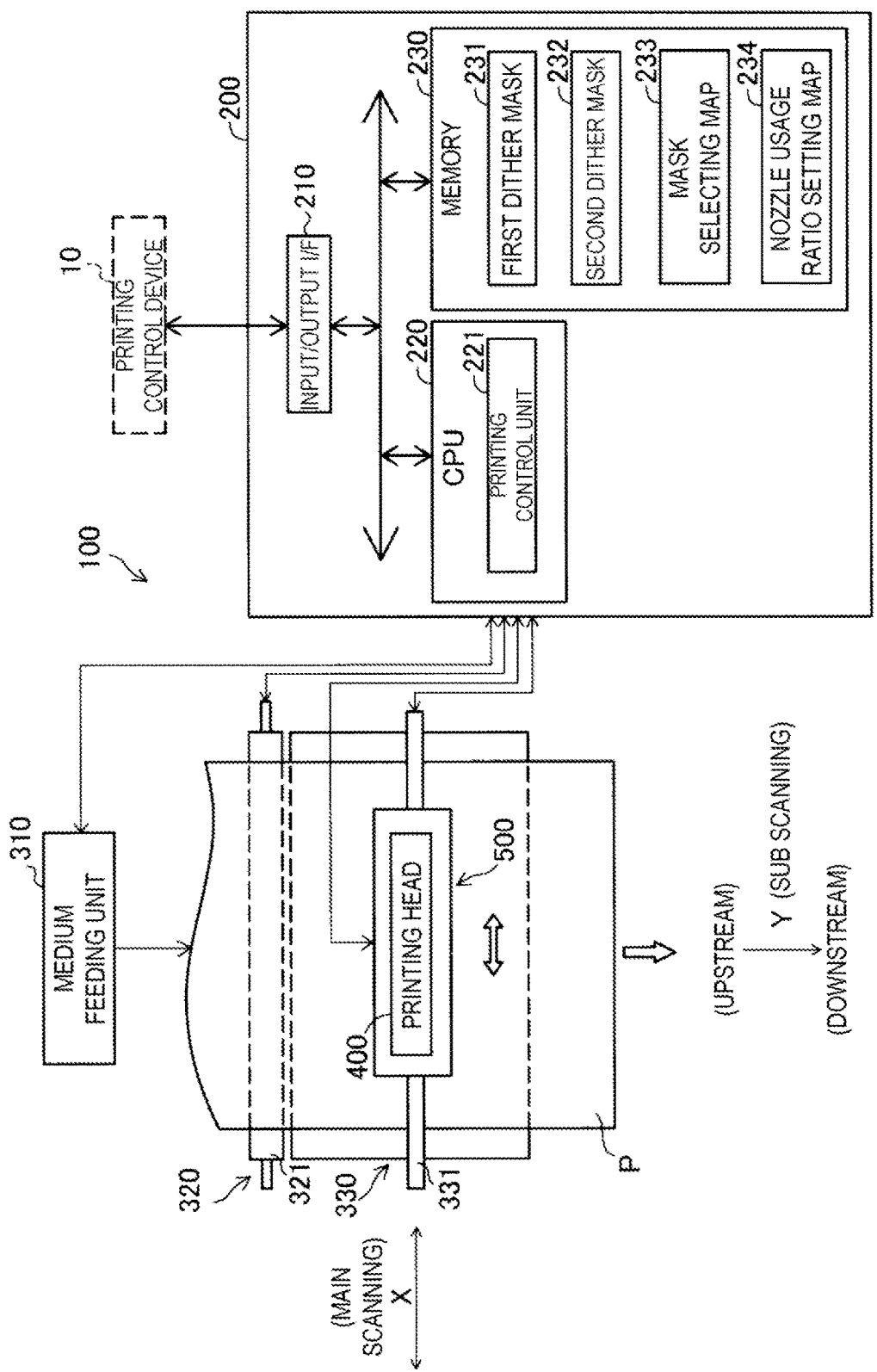
FIG. 1 is a block diagram illustrating a schematic configuration of a printing apparatus according to an exemplary embodiment of the invention.

FIG. 1 is a block diagram illustrating a schematic configuration of a printing apparatus 100 according to an exemplary embodiment of the invention. The printing apparatus 100 is a serial ink jet-type printer. The printing apparatus 100 is configured to print an image, a character, and the like by converting image data input from a printing control device 10 to printing data, causing a plurality of nozzles to discharge inks onto a medium P based on the printing data to form dots on the medium P. Specifically, in the printing apparatus 100, inks of three or more colors including black and yellow are discharged. In the First Exemplary Embodiment, in the printing apparatus 100, inks of four colors of cyan (C), magenta (M), yellow (Y), and black (K) are discharged. In the First Exemplary Embodiment, the medium P is a printing paper sheet. Note that, the medium P is not limited to the printing paper sheet, and any medium on which an image or the like can be formed with ink dots may be used.

The printing apparatus 100 includes a control unit 200, a medium feeding unit 310, a medium conveyance unit 320, a carriage conveyance unit 330, a carriage 500, and a printing head 400.

The control unit 200 is configured to perform overall control of the printing apparatus 100. The control unit 200 is formed of a microcomputer, and includes a CPU 220, a memory 230, and an input/output interface (input/output I/F) 210. The CPU 220, the memory 230, and the input/output interface 210 are connected to an internal bus, and are formed to be capable of communicating with each other.

The CPU 220 is configured to execute a control program (not illustrated) stored in the memory 230 in advance to function as a printing control unit 221. The printing control unit 221 is configured to perform processing for generating printing data from image data input from the printing control device 10 and integrated control processing for printing based on the printing data. Specifically, the printing control unit 221 is configured to convert a resolution of the image data input from the printing control device 10 to a printing resolution to obtain the image data expressed with gradation values of the ink colors C, M, Y, and K. Further, the printing control unit 221 is configured to convert the image data of each ink color to two-level gradation values indicating presence or absence of dots of each ink color, that is, a two-level gradation value indicating dot presence (255) and dot absence (0). The printing control unit 221 is configured to rasterize the data indicating presence or absence of dots of each ink color C, M, Y, or K on the medium P, and generate the printing data containing a command for printing control.

Further, based on the printing data, the printing control unit 221 is configured to generate a signal for driving nozzle groups provided to the printing head 400 (hereinafter, referred to as "input signal"), and transmit the signal to the printing head 400. The printing control unit 221 is configured to control the medium feeding unit 310 to control feeding of the medium P. The printing control unit 221 is configured to control the medium conveyance unit 320 to convey the medium P. In FIG. 1, the medium P is conveyed from upstream to downstream along a sub scanning direction Y. The printing control unit 221 is configured to control the carriage conveyance unit 330 to reciprocate the carriage 500. In FIG. 1, the carriage 500 is configured to move along a main scanning direction X. The main scanning direction X is a direction intersecting the sub scanning direction Y, and a direction orthogonal to the sub scanning direction Y in the First Exemplary Embodiment.

In the memory 230, a first dither mask 231, a second dither mask 232, a mask selecting map 233, and a nozzle usage ratio setting map 234 are stored in advance. The first dither mask 231 and the second dither mask 232 are dither masks different from each other. In the First Exemplary Embodiment, in halftone processing in printing processing, which is described below, dot data of a certain image area (overlapping area described below) in an image area indicated by the image data is generated through use of a threshold value set in the first dither mask 231, and dot data of a certain image area (single printing chip area described below) in the image area indicated by the image data is generated through use of a threshold value set in the second dither mask 232. In the mask selecting map 233, a dither mask to use, which is selected between the first dither mask 231 and the second dither mask 232, is set in advance with respect to each pixel of the image data. In the nozzle usage ratio setting map 234, a nozzle usage ratio for nozzles is set advance. In the printing processing described below, the printing control unit 221 causes each nozzle to discharge ink based on the nozzle usage ratio. Note that, the nozzle usage ratio is described below in detail.

In the printing apparatus 100, the input/output interface 210 includes various interface groups for connection with an external device. As the external device, the printing control device 10, a digital still camera (not illustrated), and a smartphone (not illustrated) are exemplified. As the various interface groups, there are exemplified interface groups for performing communication through, for example, a Universal Serial Bus (USB), Bluetooth (trade name), various wired LANs specified in IEEE802.3 standard, and various wireless LANs specified in IEEE802.11 standard. The input/output interface 210 outputs the image data input from the external device to the CPU 220.

The printing control device 10 is configured to be capable of communicating with the printing apparatus 100, and cause the printing apparatus 100 to perform printing by transmitting the image data of an object to be printed. In the First Exemplary Embodiment, the printing control device 10 is formed of a personal computer. A printer driver is included in an operating system to be operated in the printing control device 10.

The medium feeding unit 310 includes a paper sheet tray (not illustrated). In response to a control signal from the printing control unit 221, the medium feeding unit 310 feeds the medium P stored in the paper sheet tray to downstream in the sub scanning direction Y. Note that, in place of the paper sheet tray, a roll body around which the medium P is wound, a roll drive motor, and a roll drive wheel may be included.

The medium conveyance unit 320 includes a conveyance roller 321. The medium conveyance unit 320 is configured to drive, in response to a control signal from the printing control unit 221, a conveyance roller 321 to rotate, to thereby move the medium P fed from the medium feeding unit 310 relatively to the carriage conveyance unit 330. Although not illustrated, sensors such as a feeding detection sensor for detecting a conveyance amount of the medium P and a leading-edge detection sensor for detecting a leading-edge position of the medium P are provided to the medium conveyance unit 320. The printing control unit 221 is configured to control the medium conveyance unit 320 with reference to signals from those sensors.

The carriage conveyance unit 330 is configured to reciprocate, in response to a control signal from the printing control unit 221, the carriage 500 in the main scanning direction X. The carriage conveyance unit 330 includes a carriage guide shaft 331 and a carriage motor (not illustrated). The carriage guide shaft 331 is arranged in the main scanning direction X, and both ends of carriage guide shaft 331 are fixed to a housing of the printing apparatus 100.

The carriage 500 is mounted to the carriage guide shaft 331 so as to be reciprocable in the main scanning direction X. The carriage conveyance unit 330 is configured to drives the carriage motor in response to a control signal from the printing control unit 221. The carriage 500 is configured to, with this action, reciprocate along the carriage guide shaft 331. Further, although not illustrated, the carriage conveyance unit 330 includes a carriage position sensor configured to detect a position of the carriage 500. The printing control unit 221 is configured to control a moving amount of the carriage 500 with reference to a signal from the carriage position sensor. The carriage 500 is configured to reciprocate in the main scanning direction X as described above with discharge of ink from the printing head 400, and the medium P is conveyed in the sub scanning direction Y. In this manner, an image or the like is printed on the medium P.

The printing head 400 is provided with four printing heads in total. Each printing head includes two printing chips with a plurality of nozzles (nozzle groups) discharging inks of colors (C, M, Y, and K). The printing head 400 is mounted to the carriage 500, and is configured to reciprocate on the medium P in the main scanning direction X along with reciprocation of the carriage 500.

In the First Exemplary Embodiment, the main scanning direction X corresponds to a subordinate concept to the second direction described in Summary. Further, the sub scanning direction Y and the medium conveyance unit 320 correspond to a subordinate concept to the first direction in Summary and a subordinate concept to the conveyance unit in Summary, respectively.

A2. Detailed Configuration of Printing Head

Figure 2:
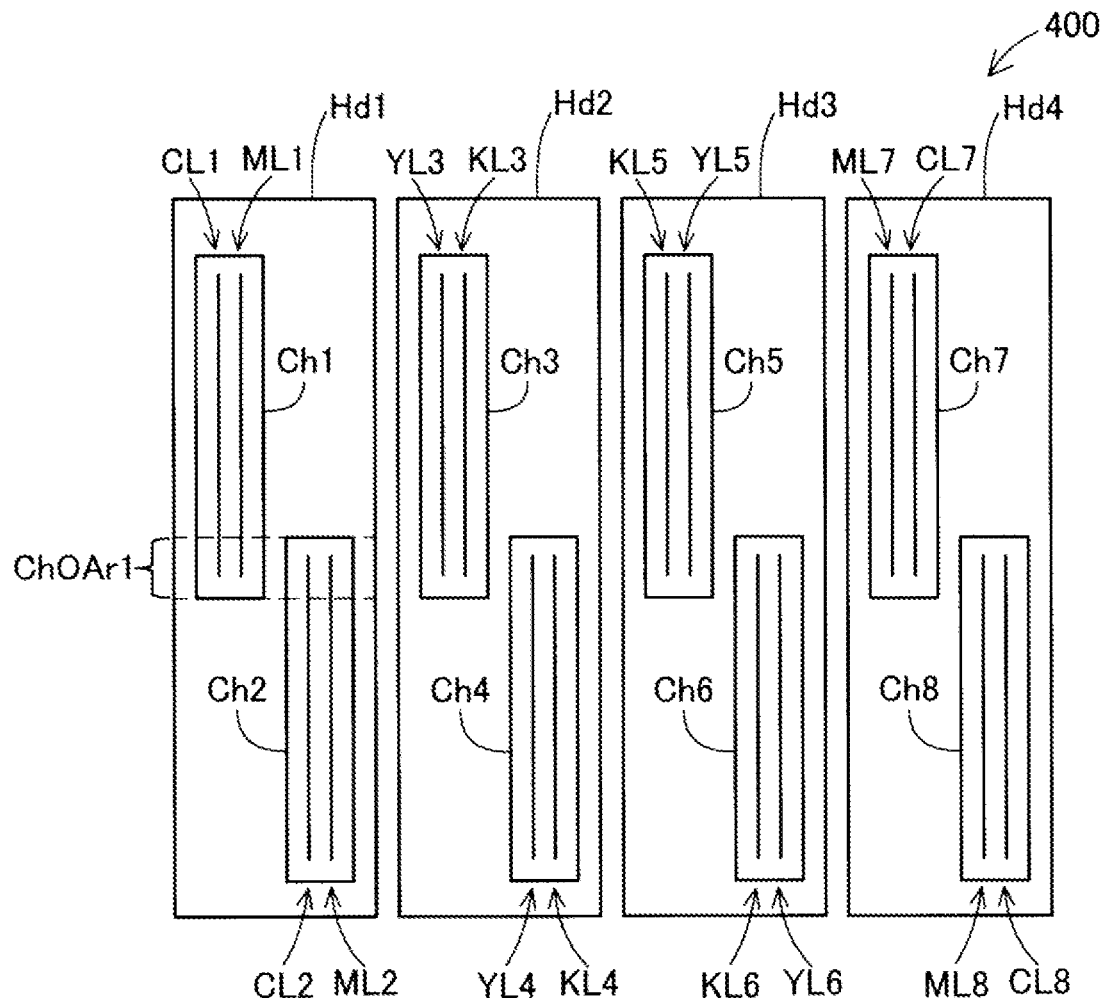
FIG. 2 is an explanatory view illustrating a detailed configuration of a printing head.

FIG. 2 is an explanatory view illustrating a detailed configuration of the printing head 400. In FIG. 2, the configuration of the printing head 400 is illustrated when viewed in a direction from the medium P to the carriage 500. The printing head 400 includes a first printing head Hd1, a second printing head Hd2, a third printing head Hd3, and a fourth printing head Hd4. Each of the printing heads Hd1 to Hd4 includes two printing chips. The two printing chips of each of the printing heads Hd1 to Hd4 are similarly arranged at similar positions on each of the printing heads Hd1 to Hd4. Specifically, the two printing chips of each of the printing heads Hd1 to Hd4 are arranged so as to partially overlap with each other in the main scanning direction X.

The first printing head Hd1 includes a first printing chip Ch1 and a second printing chip Ch2. The second printing head Hd2 includes a third printing chip Ch3 and a fourth printing chip Ch4. The third printing head Hd3 includes a fifth printing chip Ch5 and a sixth printing chip Ch6. The fourth printing head Hd4 includes a seventh printing chip Ch7 and an eighth printing chip Ch8. Each of the printing chips Ch 1 to Ch8 is a printing chip obtained by chipping an ink discharge mechanism including a piezoelectric element, an ink chamber, and a nozzle through application of a semiconductor processing technique.

The first printing chip Ch1 includes two nozzle rows (nozzle groups) from which inks of two respective colors are discharged. Specifically, the first printing chip Ch1 includes a first nozzle row CL1 for discharging ink of cyan (C) and a second nozzle row ML1 for discharging ink of magenta (M). Similarly, the second printing chip Ch2 includes a third nozzle row CL2 for discharging ink of cyan (C) and a fourth nozzle row ML2 for discharging ink of magenta (M). As described above, the two printing chips Ch1 and Ch 2 each include the two nozzle rows for discharging inks of the same color combination.

Similarly, the third printing chip Ch3 includes a fifth nozzle row YL3 for discharging ink of yellow (Y) and a sixth nozzle row KL3 for discharging ink of black (K). The fourth printing chip Ch4 includes a seventh nozzle row YL4 for discharging ink of yellow (Y) and an eighth nozzle row KL4 for discharging ink of black (K).

The fifth printing chip Ch5 includes a ninth nozzle row KL5 for discharging ink of black (K) and a tenth nozzle row YL5 for discharging ink of yellow (Y). The sixth printing chip Ch6 includes an eleventh nozzle row KL6 for discharging ink of black (K) and a twelfth nozzle row YL6 for discharging ink of yellow (Y).

The seventh printing chip Ch7 includes a thirteenth nozzle row ML7 for discharging ink of magenta (M) and a fourteenth nozzle row CL7 for discharging ink of cyan (C). The eighth printing chip Ch8 includes a fifteenth nozzle row ML8 for discharging ink of magenta (M) and a sixteenth nozzle row CL8 for discharging ink of cyan (C).

The two nozzle rows in each of the printing chips Ch 1 to Ch8 are arranged away from each other in the main scanning direction X. Specifically, the first nozzle row CL1 and the second nozzle row ML1 are arranged away from each other in the main scanning direction X. Similarly, the third nozzle CL2 and the fourth nozzle row ML2 are arranged away from each other in the main scanning direction X. Further, the fifth nozzle row YL3 and the sixth nozzle row KL3 are arranged away from each other in the main scanning direction X. The seventh nozzle row YL4 and the eighth nozzle row KL4 are arranged away from each other in the main scanning direction X. The ninth nozzle row KL5 and the tenth nozzle row YL5 are arranged away from each other in the main scanning direction X. The eleventh nozzle row KL6 and the twelfth nozzle row YL6 are arranged away from each other in the main scanning direction X. The thirteenth nozzle row ML7 and the fourteenth nozzle row CL7 are arranged away from each other in the main scanning direction X. The fifteenth nozzle row ML8 and the sixteenth nozzle row CL8 are arranged away from each other in the main scanning direction X.

An input signal is supplied from the printing control unit 221 to each of the printing chips Ch 1 to Ch8, and ink is discharged from each nozzle row in response to the input voltage.

As describe above, the two printing chips of each of the printing heads Hd1 to Hd4 are arranged so as to partially overlap with each other in the main scanning direction X. In the First Exemplary Embodiment, the printing control unit 221 is configured to, in an area in which the two printing chips overlap with each other when viewed from the main scanning direction X (hereinafter, referred to as "printing chip overlapping area), causes ink to be discharged based on the nozzle usage ratio set in advance so that an area in which the nozzle group in each nozzle row simultaneously discharging ink of the same color are arranged does not overlap with another area in which the nozzle group in each nozzle row simultaneously discharging inks of different colors in the main scanning direction X.

As illustrated in FIG. 2, on the first printing head Hd1, the printing chip overlapping area ChOAr1 is an area in which a downstream end of the first printing chip Ch1 in the sub scanning direction Y and an upstream end of the second printing chip Ch2 in the sub scanning direction Y overlap with each other in the main scanning direction X. Further, on the second printing head Hd2, a downstream end of the third printing chip Ch3 in the sub scanning direction Y and an upstream end of the fourth printing chip Ch4 in the sub scanning direction Y overlap with each other in the main scanning direction X, and also overlap with the printing chip overlapping area ChOAr1 in the main scanning direction X. On the third printing head Hd3, a downstream end of the fifth printing chip Ch5 in the sub scanning direction Y and an upstream end of the sixth printing chip Ch6 in the sub scanning direction Y overlap with each other in the main scanning direction X, and also overlap with the printing chip overlapping area ChOAr1 in the main scanning direction X. On the fourth printing head Hd4, a downstream end of the seventh printing chip Ch7 in the sub scanning direction Y and an upstream end of the eighth printing chip Ch8 in the sub scanning direction Y overlap with each other in the main scanning direction X, and also overlap with the printing chip overlapping area ChOAr1 in the main scanning direction X. In other words, the printing chips Ch 1 to Ch8 of the printing heads Hd1 to Hd4 partially overlap with each other in the main scanning direction X.

A3. Printing Chip Overlapping Area and Nozzle Usage Ratio

Figure 3:
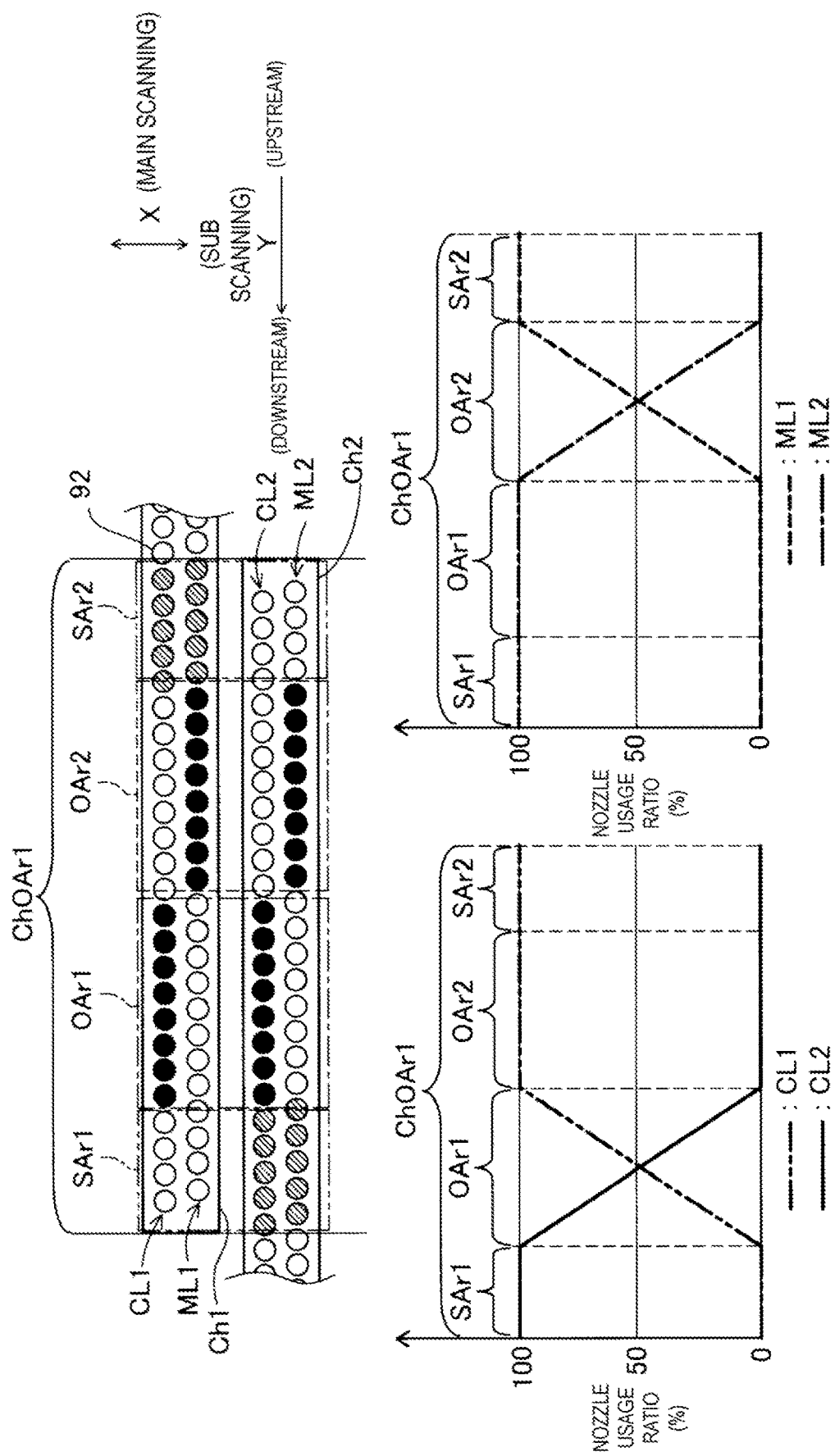
FIG. 3 is an explanatory view illustrating a configuration of nozzle rows in a printing chip overlap area and a nozzle usage ratio thereof.

FIG. 3 is an explanatory view illustrating a configuration of nozzle rows in the printing chip overlapping area ChOAr1 and the nozzle usage ratio. In an upper part of FIG. 3, detailed configurations of the nozzle rows CL1, CL2, ML1, and ML2 in the printing chip overlapping area ChOAr1 are illustrated. In a lower left part in FIG. 3, a nozzle usage ratio of each of the first nozzle row CL1 and the third nozzle row CL2 in the printing chip overlapping area ChOAr1 is illustrated. In a lower right part in FIG. 3, a nozzle usage ration of each of the second nozzle row ML1 and the fourth nozzle row ML2 in the printing chip overlapping area ChOAr1 is illustrated. As illustrated in the upper part of FIG.

3, each of the nozzle rows CL1, ML1, CL2, and ML2 includes a plurality of nozzles 92 arrayed at a predetermined interval in a nozzle row direction. In the First Exemplary Embodiment, "nozzle row direction" indicates the sub scanning direction Y. Note that, the nozzle row direction is not limited to the sub scanning direction Y, and may be the main scanning direction X or a direction intersecting the main scanning direction X and the sub scanning direction Y.

The nozzles 92 of the nozzle rows CL1, ML1, CL2, and ML2 in the printing chip overlapping area ChOAr1 are classified into a nozzle group belonging to two overlapping areas OAr1 and OAr2 and a nozzle group belonging to two single printing chip areas SAr1 and SAr2. In the First Exemplary Embodiment, "overlapping area" is an area in which dots are formed on the medium P with ink discharged from the nozzles 92 of the two nozzle rows for discharging ink of the same color in the different printing chips, and an area in which the nozzle usage ratios of the two nozzle rows are neither 0% nor 100%. "Nozzle usage ratio" is a ratio of inks discharged from the nozzles 92, and a ratio of the number of dots, which are formed by the nozzles 92 in one main scanning, to all the dots in the main scanning direction X. In the above-mentioned nozzle usage ratio setting map 234, a nozzle usage ratio for each nozzle row in the area is set in advance.

Further, "single printing chip area" is an area in which dots are formed on the medium P with ink discharged from the nozzles 92 of each nozzle row in the single printing chip. In FIG. 3, each of the nozzles 92 for discharging ink in the overlapping areas OAr1 and OAr2 is indicated with a black circle, and each of the nozzles 92 for discharging ink in the single printing chip areas SAr1 and SAr2 is indicated with a hatched circle.

As illustrated in the upper part of FIG. 3, the first single printing chip area SAr1 is positioned on most downstream in the printing chip overlapping area ChOAr1 in the sub scanning direction Y. In the first single printing chip area SAr1, the nozzles 92 of the nozzle rows CL2 and ML2 in the second printing chip Ch2 are caused to discharge ink so that dots are formed on the medium P. The first overlapping area OAr1 is positioned upstream of the first single printing chip area SAr1 in the sub scanning direction Y. In the first overlapping area OAr1, the nozzles 92 of the first nozzle row CL1 in the first printing chip Ch1 and the nozzles 92 of the third nozzle row CL2 in the second printing chip Ch2 are caused to discharge ink of cyan so that dots are formed on the medium P.

The second overlapping area OAr2 is positioned upstream of the first overlapping area OAr1 in the sub scanning direction Y. In the second overlapping area OAr2, the nozzles 92 of the second nozzle row ML1 in the first printing chip Ch1 and the nozzles 92 of the fourth nozzle row ML2 in the second printing chip Ch2 are caused to discharge ink of magenta so that dots are formed on the medium P. The second single printing chip area SAr2 is positioned upstream of the second overlapping area OAr2 in the sub scanning direction Y. In the second single printing chip area SAr2, the nozzles 92 of the nozzle rows CL1 and ML1 in the first printing chip Ch1 are caused to discharge ink so that dots are formed on the medium P.

In a case where the total number of nozzles 92 in the printing chip overlapping area ChOAr1 is 40, the number of nozzles 92 in each of the overlapping areas OAr1 and OAr2 and the number of nozzles 92 in each of the single printing chip areas SAr1 and SAr2 in the printing chip overlapping area ChOAr1 are set as follows. That is, for example, the number of nozzles 92 in each of the overlapping areas OAr1 and OAr2 is 12, and the number of nozzles 92 in each of the single printing chip areas SAr1 and SAr2 is eight. Note that, the total number of nozzles 92 in the printing chip overlapping area ChOAr1, the number of nozzles 92 in each of the overlapping areas OAr1 and OAr2, and the number of nozzles 92 in each of the single printing chip areas SAr1 and SAr2 are not limited to the above-mentioned example, and may be any number.

The first overlapping area OAr1 and the second overlapping area OAr2 do not overlap with each other when viewed from the main scanning direction X. The reason for this is as follows. That is, in a case where landing position deviation of ink droplets is caused in the first overlapping area OAr1 and the second overlapping area OAr2 due to, for example, variation of an ink discharge amount and an ink discharge speed and the like caused by a drive frequency difference among the nozzles 92, concentration of uneven density (streaks) in the main scanning direction X in a printing image can be suppressed. In this manner, degradation of printing image quality can be suppressed.

In each of the lower right and left parts of FIG. 3, a vertical axis indicates a nozzle usage ratio, and a horizontal axis indicates the printing chip overlapping area ChOAr1. The horizontal axis corresponds to positions of the nozzles 92 in the sub scanning direction Y in the printing chip overlapping area ChOAr1, which are illustrated in the upper part of FIG. 3. In the lower left part of FIG. 3, as indicated with the two-dot chain line, the nozzle usage ratio of the nozzles 92 of the first nozzle row CL1 is set to 100% from upstream in the sub scanning direction Y to most upstream in the first overlapping area OAr1. The nozzle usage ratio of the nozzles 92 of the first nozzle row CL1 may be set so as to be gradually reduced from upstream to downstream in the sub scanning direction Y in the first overlapping area OAr1. The nozzle usage ratio of the nozzle 92 is set to 0% on most downstream in the first overlapping area OAr1. The nozzle usage ratio of the nozzles 92 of the first nozzle row CL1 is set to 0% on downstream of the first overlapping area OAr1 in the sub scanning direction Y.

In the lower left part of FIG. 3, as indicated with the solid line, the nozzle usage ratio of the nozzles 92 of the third nozzle row CL2 is set to 0% from upstream in the sub scanning direction Y to most upstream in the first overlapping area OAr1. In the first overlapping area OAr1, the nozzle usage ratio of the nozzles 92 of the third nozzle row CL2 is set so as to be gradually increased from upstream to downstream in the sub scanning direction Y. The nozzle usage ratio of the nozzle 92 is set to 100% on most downstream in the first overlapping area OAr1. The nozzle usage ratio of the nozzles 92 of the third nozzle row CL2 is set to 100% on downstream of the first overlapping area OAr1 in the sub scanning direction Y.

In the lower right part of FIG. 3, as indicated with the dashed line, the nozzle usage ratio of the nozzles 92 of the second nozzle row ML1 is set to 100% from upstream in the sub scanning direction Y to most upstream in the second overlapping area OAr2. In the second overlapping area OAr2, the nozzle usage ratio of the nozzles 92 of the second nozzle row ML1 is set so as to be gradually reduced from upstream to downstream in the sub scanning direction Y. The nozzle usage ratio of the nozzle 92 is set to 0% on most downstream in the second overlapping area OAr2. The nozzle usage ratio of the nozzles 92 of the second nozzle row ML1 is set to 0% on downstream of the second overlapping area OAr2 in the sub scanning direction Y.

In the lower right part of FIG. 3, as indicated with the one-dot chain line, the nozzle usage ratio of the nozzles 92 of the fourth nozzle row ML2 is set to 100% from upstream in the sub scanning direction Y to most upstream in the second overlapping area OAr2. In the second overlapping area OAr2, the nozzle usage ratio of the nozzles 92 of the fourth nozzle row ML2 is set so as to be gradually increased from upstream to downstream in the sub scanning direction Y. The nozzle usage ratio of the nozzle 92 is set to 100% on most downstream in the second overlapping area OAr2. The nozzle usage ratio of the nozzles 92 of the fourth nozzle row ML2 is set to 100% on downstream of the second overlapping area OAr2 in the sub scanning direction Y.

As illustrated in the lower left part of FIG. 3, in the first overlapping area OAr1, the nozzle usage ratio of the first nozzle row CL1 and the nozzle usage ratio of the third nozzle row CL2 is set to values, which are neither 0% nor 100%. Further, the nozzle usage ratios are set so that the sum of the nozzle usage ratios of the nozzle rows CL1 and CL2 is 100%. As illustrated in the lower right part of FIG. 3, in the second overlapping area OAr2, the nozzle usage ratio of the second nozzle row ML1 and the nozzle usage ratio of the fourth nozzle row ML2 are set to values, which are neither 0% nor 100%. The nozzle usage ratios are set so that the sum of the nozzle usage ratios of the nozzle rows ML1 and ML2 is 100%.

A4. Printing Processing

Figure 4:
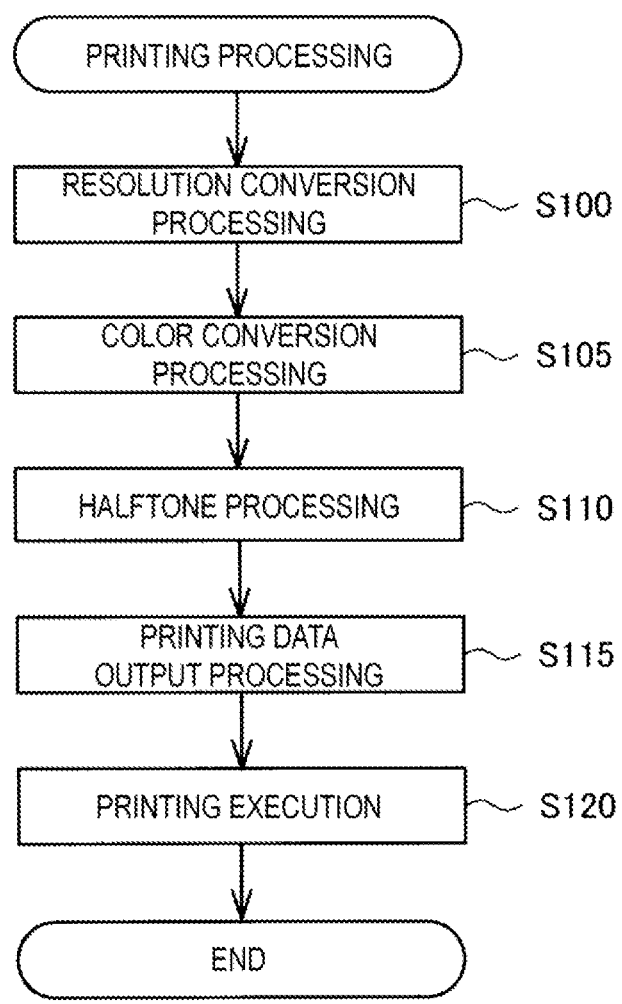
FIG. 4 is a flowchart illustrating a process procedure of printing processing.

FIG. 4 is a flowchart illustrating a process procedure of the printing processing. In the First Exemplary Embodiment, the printing data is generated so that the first overlapping area OAr1 and the second overlapping area OAr2 do not overlap with each other when viewed from the main scanning direction X and the nozzle usage ratio in each of the overlapping areas OAr1 and OAr2 is set to the nozzle usage ratio illustrated in FIG. 3. Then, printing is performed based on the printing data. Now, detailed description is given.

As illustrated in FIG. 4, the printing processing is started when, for example, a user designates the image data and instructs to perform printing by the printing control device 10. The printing control unit 221 performs resolution conversion processing on the designated image data (Step S100). As the image data being a processing target, image data generated by an application (not illustrated) in the printing control device 10 or image data received from an input interface (not illustrated) are exemplified. In the First Exemplary Embodiment, the image data is formed of gradation values of colors, red (R), green (G), and blue (B). In Step S100, the printing control unit 221 converts a resolution of the image data to a resolution for performing printing on the medium P.

The printing control unit 221 performs color conversion processing (Step S105). Specifically, with reference to a color conversion table (not illustrated) stored in the memory 230, the printing control unit 221 converts the RGB image data to CMYK data of 256-level gradation with gradation values of colors (C, M, Y, and K) of ink used in the printing apparatus 100.

The printing control unit 221 performs halftone processing on the CMYK data to which the color conversion has been applied (Step S110). Specifically, with reference to the first dither mask 231 and the second dither mask 232 stored in the memory 230, the printing control unit 221 converts the gradation values of 256 levels (steps) of the CMYK data to four-level gradation values (two-bit data) that can be expressed with the printing apparatus 100. The four levels include two patterns of single use, combination use, and disuse of two kinds of dots having different sizes (a large dot and a small dot). In Step S110, with reference to the mask selecting map 233, the printing control unit 221 acquires each threshold value from a corresponding dither mask. Specifically, the printing control unit 221 generates CMYK data through use of the threshold value set in the first dither mask 231 for the overlapping areas OAr1 and OAr2, and generates the CMYK data through use of the threshold value set in the second dither mask 232 for the single printing chip areas SAr1 and SAr2.

The printing control unit 221 performs rasterizing processing, based on the image data to which the halftone processing has been applied, and outputs the resultant printing data (Step S115). Specifically, the printing control unit 221 generates the printing data by associating the image data to which the halftone processing has been applied with the nozzles 92, based on the above-mentioned nozzle usage ratios, and adding a printing control command.

When the generation of the printing data is completed, the printing control unit 221 controls the carriage conveyance unit 330 and the medium conveyance unit 320 to perform printing (Step S120). Specifically, a plurality of times of scanning of the carriage conveyance unit 330 and discharge of ink onto the medium P, and conveyance of the medium P to downstream in the sub scanning direction Y are alternately repeated. In this manner, dots are formed on the medium P.

In the printing apparatus 100 having the above-mentioned configuration according to the First Exemplary Embodiment, in the printing chip overlapping area ChOAr1, ink is discharged so that the first overlapping area OAr1 and the second overlapping area OAr2 do not overlap with each other when viewed from the main scanning direction X. Thus, in a case where landing position deviation of ink droplets is caused both in the first overlapping area OAr1 and the second overlapping area OAr2, the areas in which landing position deviation is caused are dispersed in the main scanning direction X so that uneven density is prevented from appearing in an overlapping manner in the main scanning direction X in the printing image. In this manner, degradation of the printing image quality in the printing chip overlapping area ChOAr1 can be suppressed.

B. Second Exemplary Embodiment

The printing apparatus 100 and the printing head 400 in a Second Exemplary Embodiment are similar to the printing apparatus 100 and the printing head 400 in the First Exemplary Embodiment, which are illustrated in FIG. 1 and FIG. 2. Thus, detailed description thereof is omitted. Further, the process procedure of the printing processing in the Second Exemplary Embodiment is similar to the process procedure of the printing processing in the First Exemplary Embodiment, which is illustrated in FIG. 4. Thus, detailed description thereof is omitted.

Figure 5:
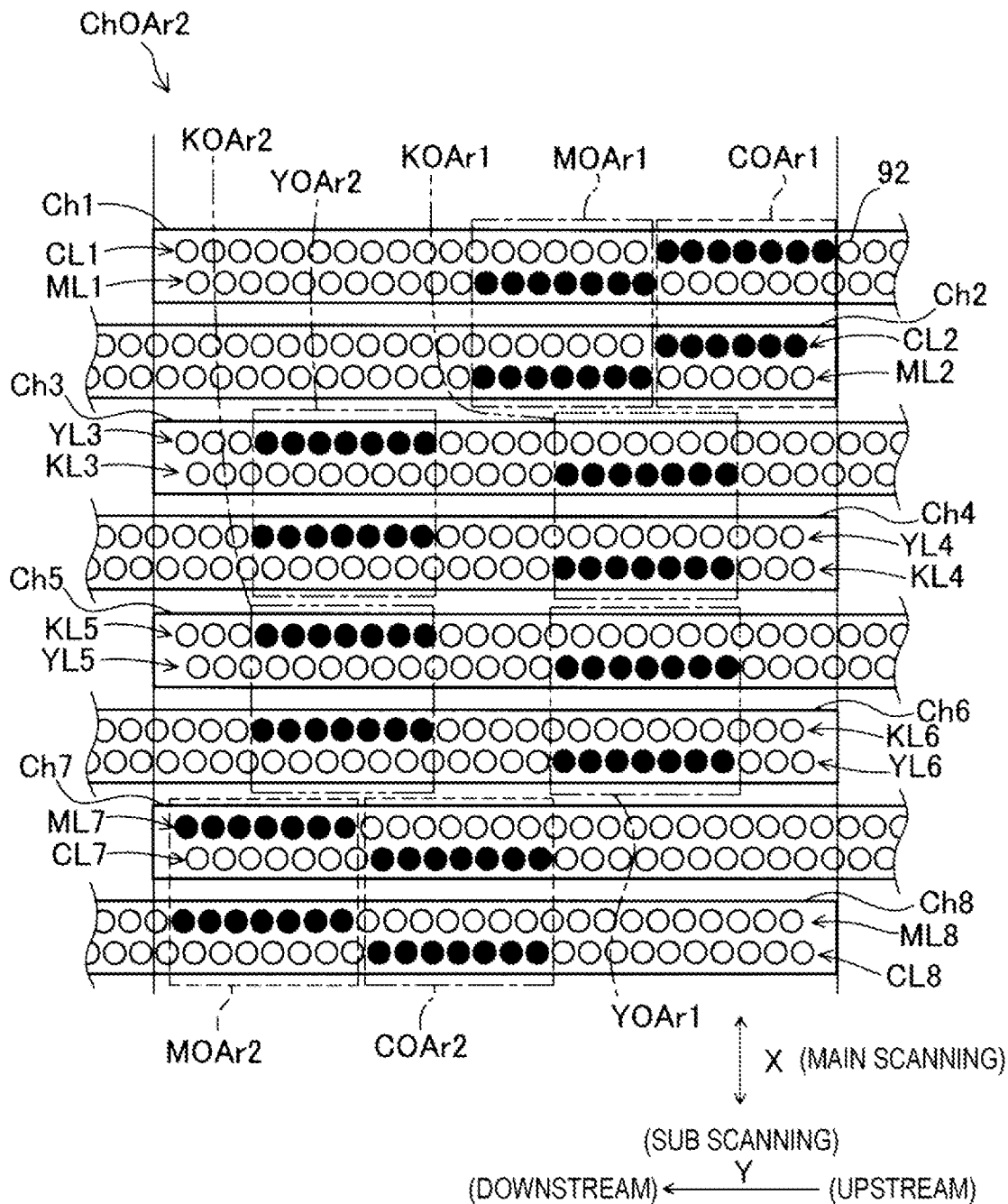
FIG. 5 is an explanatory view illustrating a printing chip overlapping area in a Second Exemplary Embodiment.

FIG. 5 is an explanatory view illustrating a printing chip overlapping area ChOAr2 in the Second Exemplary Embodiment. The printing chip overlapping area ChOAr1 in the First Exemplary Embodiment is the area in which the first printing chip Ch1 and the second printing chip Ch2 on the first printing head Hd1 overlap with each other in the main scanning direction X. As compared to this, the printing chip overlapping area ChOAr2 in the Second Exemplary Embodiment is an area in which the printing chips Ch 1 to Ch8 on the printing head 400 overlap with each other in the main scanning direction X.

The nozzles 92 of the nozzle rows CL1, ML1, CL2, ML2, YL3, KL3, YL4, KL4, KL5, YL5, KL6, YL6, ML7, CL7, ML8, and CL8 in the printing chip overlapping area ChOAr2 are classified into a nozzle group belonging to two cyan overlapping areas COAr1 and COAr2, a nozzle group belonging to two magenta overlapping areas MOAr1 and MOAr2, a nozzle group belonging to two yellow overlapping areas YOAr1 and YOAr2, and a nozzle group belonging to two black overlapping areas KOAr1 and KOAr2.

As illustrated in FIG. 5, in the first cyan overlapping area COAr1, the nozzles 92 of the first nozzle row CL1 in the first printing chip Ch1 and the nozzles 92 of the third nozzle row CL2 in the second printing chip Ch2 are caused to discharge ink of cyan to form dots on the medium P. In the second cyan overlapping area COAr2, the nozzles 92 of the fourteenth nozzle CL7 in the seventh printing chip Ch7 and the nozzles 92 of the sixteenth nozzle row CL8 in the eighth printing chip Ch8 are caused to discharge ink of cyan to form dots on the medium P.

In the first magenta overlapping area MOAr1, the nozzles 92 of the second nozzle row ML1 in the first printing chip Ch1 and the nozzles 92 of the fourth nozzle row ML2 in the second printing chip Ch2 are caused to discharge ink of magenta to form dots on the medium P. In the second magenta overlapping area MOAr2, the nozzles 92 of the thirteenth nozzle row ML7 in the seventh printing chip Ch7 and the nozzles 92 of the fifteenth nozzle row ML8 in the eighth printing chip Ch8 are caused to discharge ink of magenta to form dots on the medium P.

In the first yellow overlapping area YOAr1, the nozzles 92 of the tenth nozzle row YL5 in the fifth printing chip Ch5 and the nozzles 92 of the twelfth nozzle row YL6 in the sixth printing chip Ch6 are caused to discharge ink of yellow to form dots on the medium P. In the second yellow overlapping area YOAr2, the nozzles 92 of the fifth nozzle row YL3 in the third printing chip Ch3 and the nozzles 92 of the seventh nozzle row YL4 in the fourth printing chip Ch4 are caused to discharge ink of yellow to form dots on the medium P.

In the first black overlapping area KOAr1, the nozzles 92 of the sixth nozzle row KL3 in the third printing chip Ch3 and the nozzles 92 of the eighth nozzle row KL4 in the fourth printing chip Ch4 are caused to discharge ink of black to form dots on the medium P. In the second black overlapping area KOAr2, the nozzles 92 of the ninth nozzle row KL5 in the fifth printing chip Ch5 and the nozzles 92 of the eleventh nozzle row KL6 in the sixth printing chip Ch6 are caused to discharge ink of black to form dots on the medium P.

As illustrated in FIG. 5, the black overlapping areas KOAr1 and KOAr2 and the yellow overlapping areas YOAr1 and YOAr2 completely overlap with each other when viewed from the main scanning direction X. Specifically, the first black overlapping area KOAr1 and the first yellow overlapping area YOAr1 completely overlap with each other when viewed from the main scanning direction X. The second black overlapping area KOAr2 and the second yellow overlapping area YOAr2 completely overlap with each other when viewed from the main scanning direction X.

Meanwhile, the cyan overlapping areas and the magenta overlapping areas in the two printing chips do not overlap with each other when viewed from the main scanning direction X. Specifically, in the first printing chip Ch1 and the second printing chip Ch2, the first cyan overlapping area COAr1 and the first magenta overlapping area MOAr1 do not overlap with each other when viewed from the main scanning direction X. In the seventh printing chip Ch7 and the eighth printing chip Ch8, the second cyan overlapping area COAr2 and the second magenta overlapping area MOAr2 do not overlap with each other when viewed from the main scanning direction X.

In the printing chip overlapping area ChOAr2, the cyan overlapping areas do not overlap with each other when viewed from the main scanning direction X. Further, the magenta overlapping areas do not overlap with each other when viewed from the main scanning direction X. Specifically, in the printing chip overlapping area ChOAr2, the first cyan overlapping area COAr1 and the second cyan overlapping area COAr2 do not overlap with each other when viewed from the main scanning direction X, and are arranged away from each other in the sub scanning direction Y as much as possible. In the printing chip overlapping area ChOAr2, the first magenta overlapping area MOAr1 and the second magenta overlapping area MOAr2 do not overlap with each other when viewed from the main scanning direction X, and are arranged away from each other in the sub scanning direction Y as much as possible.

The reasons for overlapping the black overlapping areas KOAr1 and KOAr2 and the yellow overlapping areas YOAr1 and YOAr2 with each other when viewed from the main scanning direction X as described above are as follows. A large amount of ink of black and a large amount of ink of yellow are less liable to be discharged at the same time. Thus, in a case where landing position deviation of ink droplets is caused due to variation of an ink discharge amount and an ink discharge speed and the like caused by a drive frequency difference among the nozzles 92, landing position deviation is less liable to be caused at the same time in the black overlapping areas KOAr1 and KOAr2 and the yellow overlapping areas YOAr1 and YOAr2. Therefore, in the printing image, the printing image quality is less liable to be degraded.

In the structure of the printing apparatus 100, the total number of nozzles 92 in the printing chip overlapping area ChOAr2 is set in advance. With this, the black overlapping areas KOAr1 and KOAr2 and the yellow overlapping areas YOAr1 and YOAr2 completely overlap with each other. Accordingly, the number of nozzles 92 can be secured so that the overlapping areas COAr1, COAr2, MOAr1, and MOAr2 of the colors other than black and yellow do not overlap with each other when viewed from the main scanning direction X, and are positioned away from each other in the sub scanning direction Y as much as possible.

Note that, in a case where the cyan overlapping areas COAr1 and COAr2 and the magenta overlapping areas MOAr1 and MOAr2 are overlapping areas in different printing chips, the cyan overlapping areas COAr1 and COAr2 and the magenta overlapping areas MOAr1 and MOAr2 may overlap with each other when viewed from the main scanning direction X. Specifically, as illustrated in FIG. 5, the second cyan overlapping area COAr2 in the seventh printing chip Ch7 and the eighth printing chip Ch8 and the first magenta overlapping area MOAr1 in the first printing chip Ch1 and the second printing chip Ch2 partially overlap with each other when viewed from the main scanning direction X.

Figure 6:
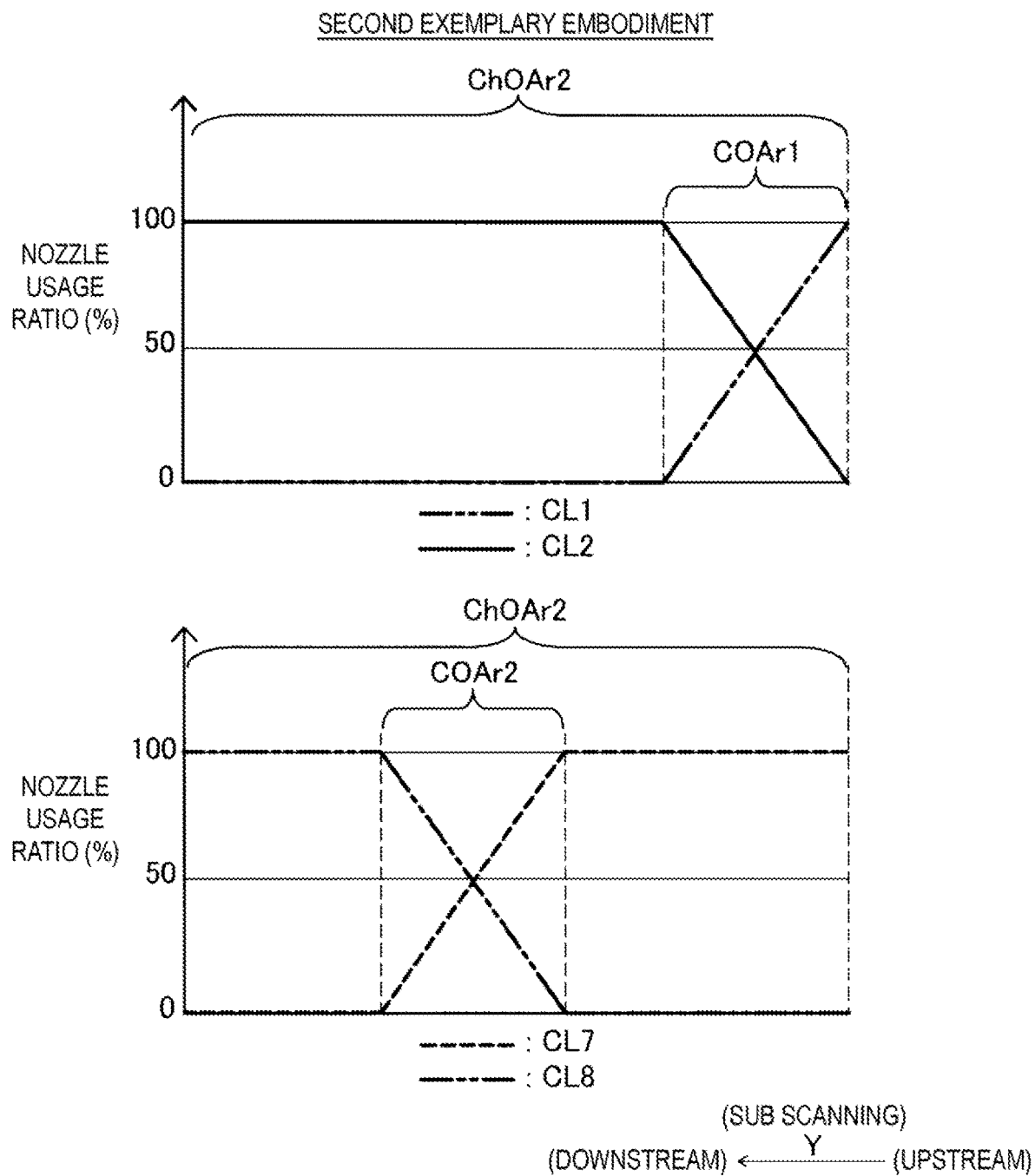
FIG. 6 is an explanatory view illustrating a nozzle usage ratio of nozzles in the printing chip overlapping area in the Second Exemplary Embodiment.
Figure 7:
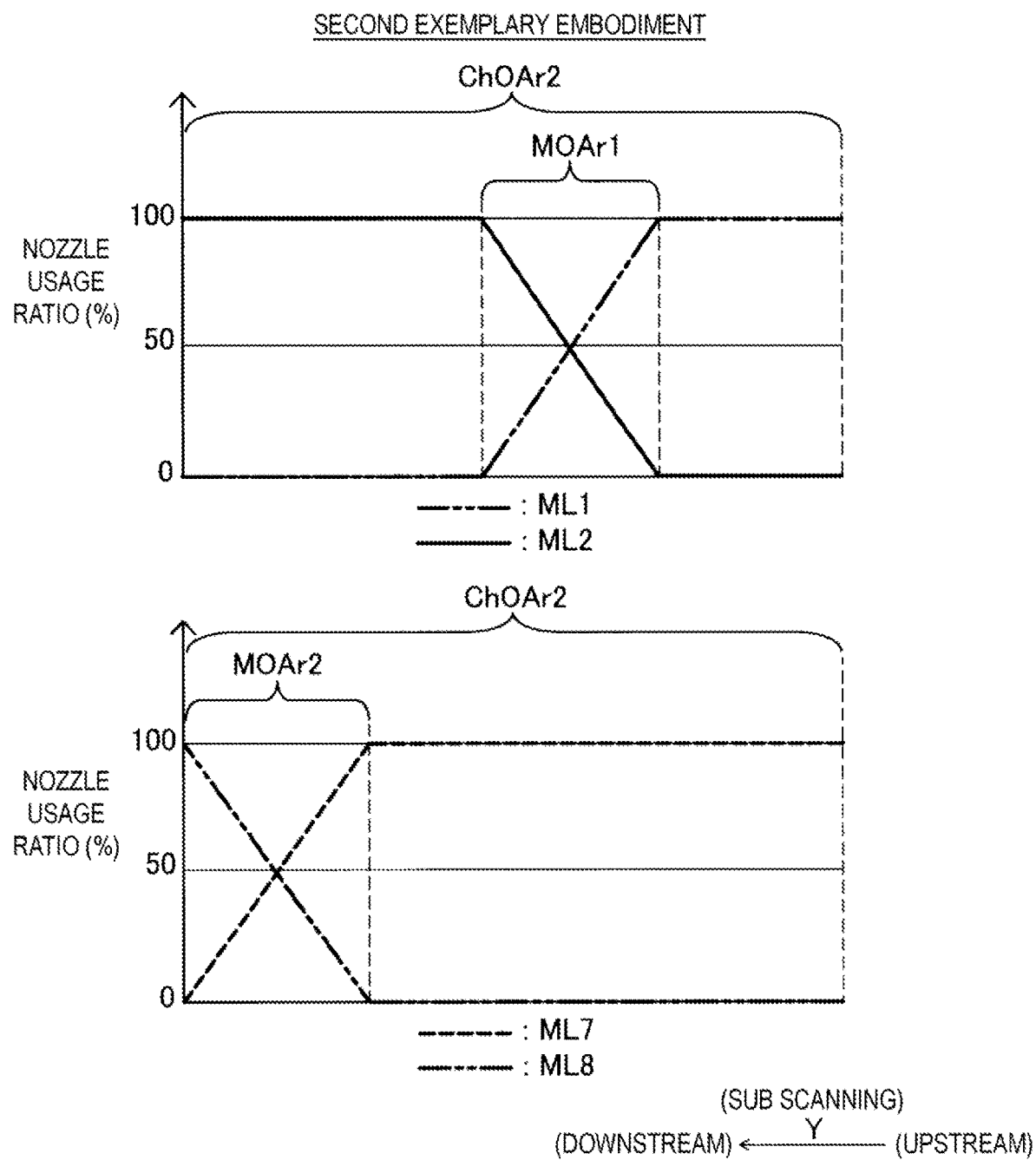
FIG. 7 is an explanatory view illustrating a nozzle usage ratio of nozzles in the printing chip overlapping area in the Second Exemplary Embodiment.
Figure 8:
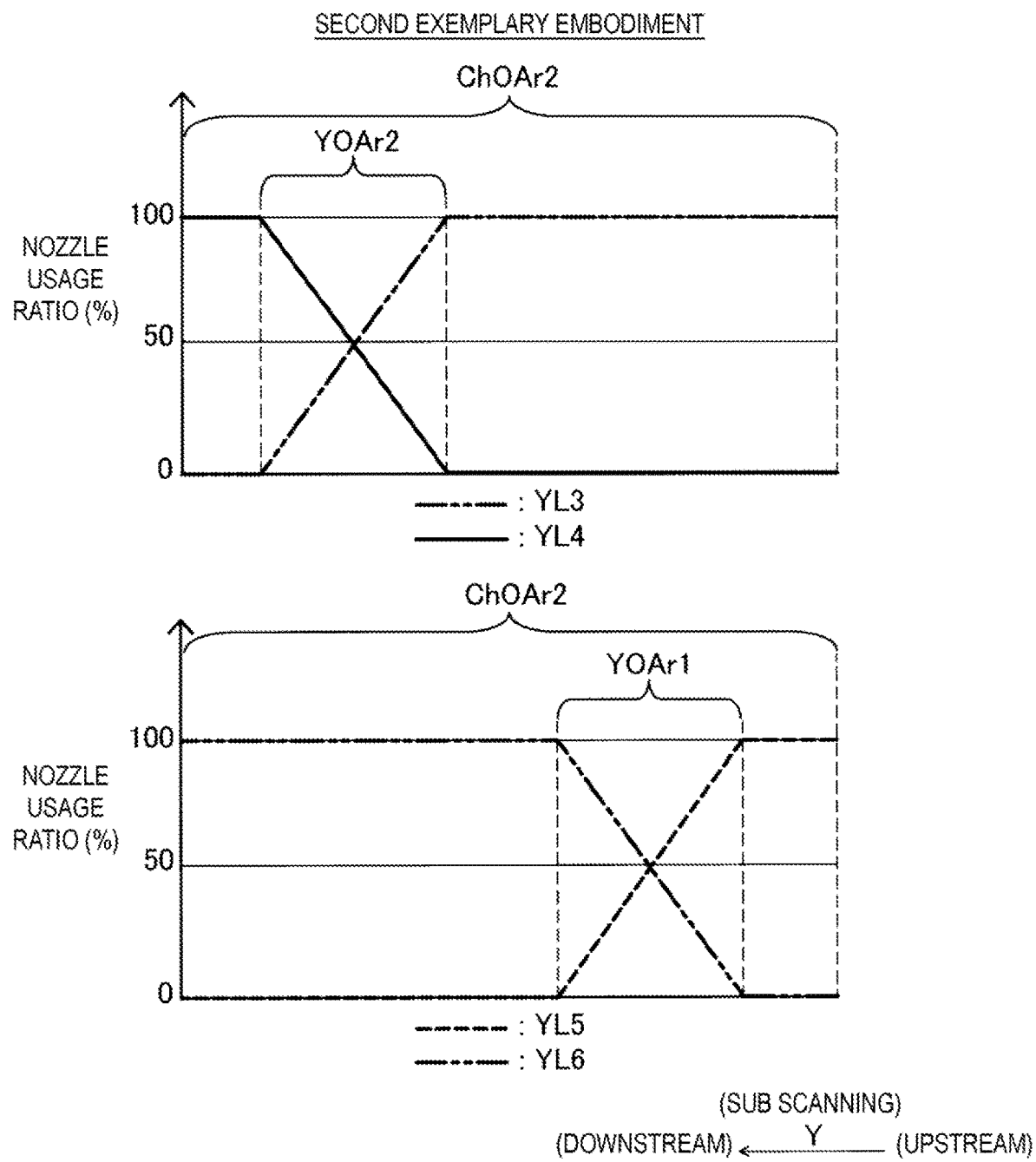
FIG. 8 is an explanatory view illustrating a nozzle usage ratio of nozzles in the printing chip overlapping area in the Second Exemplary Embodiment.

Each of FIG. 6, FIG. 7, FIG. 8, and FIG. 9 is an explanatory view illustrating a nozzle usage ratio of the nozzles 92 in the printing chip overlapping area ChOAr2 in the Second Exemplary Embodiment. FIG. 6 illustrates a nozzle usage ratio of each of the nozzle rows CL1, CL2, CL7, and CL8 for discharging ink of cyan. FIG. 7 illustrates a nozzle usage ratio of each of the nozzle rows ML1, ML2, ML7, and ML8 for discharging ink of magenta. FIG. 8 illustrates a nozzle usage ratio of each of the nozzle rows YL3, YL4, YL5, and YL 6 for discharging ink of yellow.

Figure 9:
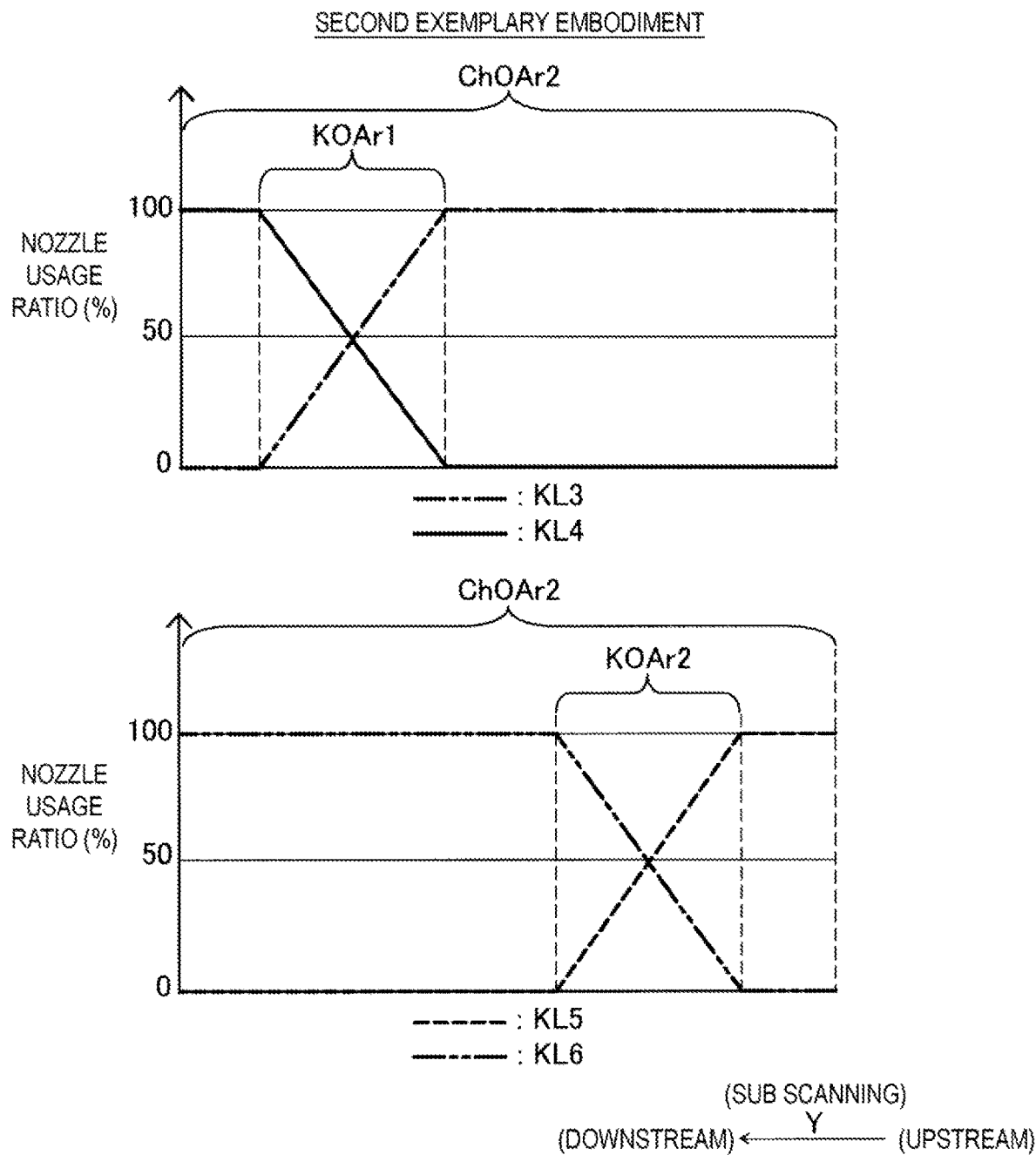
FIG. 9 is an explanatory view illustrating a nozzle usage ratio of nozzles in the printing chip overlapping area in the Second Exemplary Embodiment.

FIG. 9 illustrates a nozzle usage ratio of each of the nozzle rows KL3, KL4, KL5, and KL6 for discharging ink of black.

In an upper part of FIG. 6, as indicated with the two-dot chain line, the nozzle usage ratio of the nozzles 92 of the first nozzle row CL1 is set so as to be gradually reduced from upstream to downstream in the sub scanning direction Y in the first cyan overlapping area COAr1. The nozzle usage ratio of the nozzle 92 is set to 0% on most downstream in the first cyan overlapping area COAr1. The nozzle usage ratio of the nozzles 92 of the first nozzle row CL1 is set to 0% on downstream of the first cyan overlapping area COAr1 in the sub scanning direction Y.

In the upper part of FIG. 6, as indicated with the solid line, in the first cyan overlapping area COAr1, the nozzle usage ratio of the nozzles 92 of the third nozzle row CL2 is set so as to be gradually increased from upstream to downstream in the sub scanning direction Y. The nozzle usage ratio of the nozzle 92 may be set to 100% on most downstream in the first cyan overlapping area COAr1. The nozzle usage ratio of the nozzles 92 of the third nozzle row CL2 is set to 100% on downstream of the first cyan overlapping area COAr1 in the sub scanning direction Y.

In a lower part of FIG. 6, as indicated with the dashed line, the nozzle usage ratio of the nozzles 92 of the fourteenth nozzle row CL7 is set to 100% from upstream in the sub scanning direction Y to most upstream in the second cyan overlapping area COAr2. In the second cyan overlapping area COAr2, the nozzle usage ratio of the nozzles 92 of the fourteenth nozzle row CL7 is set so as to be gradually reduced from upstream to downstream in the sub scanning direction Y. The nozzle usage ratio of the nozzle 92 is set to 0% on most downstream in the second cyan overlapping area COAr2. The nozzle usage ratio of the nozzles 92 of the fourteenth nozzle row CL7 is set to 0% on downstream of the second cyan overlapping area COAr2 in the sub scanning direction Y.

In the lower part of FIG. 6, as indicated with the two-dot chain line, the nozzle usage ratio of the nozzles 92 of the sixteenth nozzle row CL8 is set to 0% from upstream in the sub scanning direction Y to most upstream in the second cyan overlapping area COAr2. In the second cyan overlapping area COAr2, the nozzle usage ratio of the nozzles 92 of the sixteenth nozzle row CL8 is set so as to be gradually increased from upstream to downstream in the sub scanning direction Y. The nozzle usage ratio of the nozzle 92 is set to 100% on most downstream in the second cyan overlapping area COAr2. The nozzle usage ratio of the nozzles 92 of the sixteenth nozzle row CL8 is set to 100% on downstream of the second cyan overlapping area COAr2 in the sub scanning direction Y.

In an upper part of FIG. 7, as indicated with the two-dot chain line, the nozzle usage ratio of the nozzles 92 of the second nozzle row ML1 is set to 100% from upstream in the sub scanning direction Y to most upstream in the first magenta overlapping area MOAr1. In the first magenta overlapping area MOAr1, the nozzle usage ratio of the nozzles 92 of the second nozzle row ML1 is set so as to be gradually reduced from upstream to downstream in the sub scanning direction Y. The nozzle usage ratio of the nozzle 92 is set to 0% on most downstream in the first magenta overlapping area MOAr1. The nozzle usage ratio of the nozzles 92 of the second nozzle row ML1 is set to 0% on downstream of the first magenta overlapping area MOAr1 in the sub scanning direction Y.

In the upper part of FIG. 7, as indicated with the solid line, the nozzle usage ratio of the nozzles 92 of the fourth nozzle row ML2 is set to 0% from upstream in the sub scanning direction Y to most upstream in the first magenta overlapping area MOAr1. In the first magenta overlapping area MOAr1, the nozzle usage ratio of the nozzles 92 of the fourth nozzle row ML2 is set so as to be gradually increased from upstream to downstream in the sub scanning direction Y. The nozzle usage ratio of the nozzle 92 is set to 100% on most downstream in the first magenta overlapping area MOAr1. The nozzle usage ratio of the nozzles 92 of the fourth nozzle row ML2 is set to 100% on downstream of the first magenta overlapping area MOAr1 in the sub scanning direction Y.

In a lower part of FIG. 7, as indicated with the dashed line, the nozzle usage ratio of the nozzles 92 of the thirteenth nozzle row ML7 is set to 100% from upstream in the sub scanning direction Y to most upstream in the second magenta overlapping area MOAr2. In the second magenta overlapping area MOAr2, the nozzle usage ratio of the nozzles 92 of the thirteenth nozzle row ML7 is set so as to be gradually reduced from upstream to downstream in the sub scanning direction Y. The nozzle usage ratio of the nozzle 92 is set to 0% on most downstream in the second magenta overlapping area MOAr2.

In the lower part of FIG. 7, as indicated with the two-dot chain line, the nozzle usage ratio of the nozzles 92 of the fifteenth nozzle row ML8 is set to 0% from upstream in the sub scanning direction Y to most upstream in the second magenta overlapping area MOAr2. In the second magenta overlapping area MOAr2, the nozzle usage ratio of the nozzles 92 of the fifteenth nozzle row ML8 is set so as to be gradually increased from upstream to downstream in the sub scanning direction Y. The nozzle usage ratio of the nozzle 92 is set to 100% on most downstream in the second magenta overlapping area MOAr2.

In an upper part of FIG. 8, as indicated with the two-dot chain line, the nozzle usage ratio of the nozzles 92 of the fifth nozzle row YL3 is set to 100% from upstream in the sub scanning direction Y to most upstream in the second yellow overlapping area YOAr2. In the second yellow overlapping area YOAr2, the nozzle usage ratio of the nozzles 92 of the fifth nozzle row YL3 is set so as to be gradually reduced from upstream to downstream in the sub scanning direction Y. The nozzle usage ratio of the nozzle 92 is set to 0% on most downstream in the second yellow overlapping area YOAr2. The nozzle usage ratio of the nozzles 92 of the fifth nozzle row YL3 is set to 0% on downstream of the second yellow overlapping area YOAr2 in the sub scanning direction Y.

In an upper part of FIG. 8, as indicated with the solid line, the nozzle usage ratio of the nozzles 92 of the seventh nozzle row YL4 is set to 0% from upstream in the sub scanning direction Y to most upstream in the second yellow overlapping area YOAr2. In the second yellow overlapping area YOAr2, the nozzle usage ratio of the nozzles 92 of the seventh nozzle row YL4 is set so as to be gradually increased from upstream to downstream in the sub scanning direction Y. The nozzle usage ratio of the nozzle 92 is set to 100% on most downstream in the second yellow overlapping area YOAr2. The nozzle usage ratio of the nozzles 92 of the seventh nozzle row YL4 is set to 100% on downstream of the second yellow overlapping area YOAr2 in the sub scanning direction Y.

In a lower part of FIG. 8, as indicated with the dashed line, the nozzle usage ratio of the nozzles 92 of the tenth nozzle row YL5 is set to 100% from upstream in the sub scanning direction Y to most upstream in the first yellow overlapping area YOAr1. In the first yellow overlapping area YOAr1, the nozzle usage ratio of the nozzles 92 of the tenth nozzle row YL5 is set so as to be gradually reduced from upstream to downstream in the sub scanning direction Y. The nozzle usage ratio of the nozzle 92 is set to 0% on most downstream in the first yellow overlapping area YOAr1. The nozzle usage ratio of the nozzles 92 of the tenth nozzle row YL5 is set to 0% on downstream of the first yellow overlapping area YOAr1 in the sub scanning direction Y.

In a lower part of FIG. 8, as indicated with the two-dot chain line, the nozzle usage ratio of the nozzles 92 of the twelfth nozzle row YL6 is set to 0% from upstream in the sub scanning direction Y to most upstream in the first yellow overlapping area YOAr1. In the first yellow overlapping area YOAr1, the first yellow overlapping area YOAr1, the nozzle usage ratio of the nozzles 92 of the twelfth nozzle row YL6 is set so as to be gradually increased from upstream to downstream in the sub scanning direction Y. The nozzle usage ratio of the nozzle 92 is set to 100% on most downstream in the first yellow overlapping area YOAr1. The nozzle usage ratio of the nozzles 92 of the twelfth nozzle row YL6 is set to 100% on downstream of the first yellow overlapping area YOAr1 in the sub scanning direction Y.

In an upper part of FIG. 9, as indicated with the two-dot chain line, the nozzle usage ratio of the nozzles 92 of the sixth nozzle row KL3 is set to 100% from upstream in the sub scanning direction Y to most upstream in the first black overlapping area KOAr1. In the first black overlapping area KOAr1, the nozzle usage ratio of the nozzles 92 of the sixth nozzle row KL3 is set so as to be gradually reduced from upstream to downstream in the sub scanning direction Y. The nozzle usage ratio of the nozzle 92 is set to 0% on most downstream in the first black overlapping area KOAr1. The nozzle usage ratio of the nozzles 92 of the sixth nozzle row KL3 is set to 0% on downstream of the first black overlapping area KOAr1 in the sub scanning direction Y.

In the upper part of FIG. 9, as indicated with the solid line, the nozzle usage ratio of the nozzles 92 of the eighth nozzle row KL4 is set to 0% from upstream in the sub scanning direction Y to most upstream in the first black overlapping area KOAr1. In the first black overlapping area KOAr1, the nozzle usage ratio of the nozzles 92 of the eighth nozzle row KL4 is set so as to be gradually increased from upstream to downstream in the sub scanning direction Y. The nozzle usage ratio of the nozzle 92 is set to 100% on most downstream in the first black overlapping area KOAr1. The nozzle usage ratio of the nozzles 92 of the eighth nozzle row KL4 is set to 100% on downstream of the first black overlapping area KOAr1 in the sub scanning direction Y.

In a lower part of FIG. 9, as indicated with the dashed line, the nozzle usage ratio of the nozzles 92 of the ninth nozzle row KL5 is set to 100% from upstream in the sub scanning direction Y to most upstream in the second black overlapping area KOAr2. In the second black overlapping area KOAr2, the nozzle usage ratio of the nozzles 92 of the ninth nozzle row KL5 is set so as to be gradually reduced from upstream to downstream in the sub scanning direction Y. The nozzle usage ratio of the nozzle 92 is set to 0% on most downstream in the second black overlapping area KOAr2. The nozzle usage ratio of the nozzles 92 of the ninth nozzle row KL5 is set to 0% on downstream of the second black overlapping area KOAr2 in the sub scanning direction Y.

In the lower part of FIG. 9, as indicated with the two-dot chain line, the nozzle usage ratio of the nozzles 92 of the eleventh nozzle row KL6 is set to 0% from upstream in the sub scanning direction Y to most upstream in the second black overlapping area KOAr2. In the second black overlapping area KOAr2, the nozzle usage ratio of the nozzles 92 of the eleventh nozzle row KL6 is set so as to be gradually increased from upstream to downstream in the sub scanning direction Y. The nozzle usage ratio of the nozzle 92 is set to 100% on most downstream in the second black overlapping area KOAr2. The nozzle usage ratio of the nozzles 92 of the eleventh nozzle row KL6 is set to 100% on downstream of the second black overlapping area KOAr2 in the sub scanning direction Y.

As understood by comparison with FIG. 6, FIG. 7, FIG. 8, and FIG. 9, in any area of the overlapping areas COAr1, COAr2, MOAr1, MOAr2, YOAr1, YOAr2, KOAr1, and KOAr2, the nozzle usage ratios of the nozzle rows in each of the overlapping areas are set to a value, which is neither 0% nor 100%. Further, the nozzle usage ratios are set so that the sum of the nozzle usage ratios of the nozzles rows in the overlapping areas is 100%.

Note that, in the Second Exemplary Embodiment, the black overlapping areas KOAr1 and KOAr2 correspond to a subordinate concept to the first overlapping area described in Summary. The yellow overlapping areas YOAr1 and YOAr2 correspond to a subordinate concept to the second overlapping area described in Summary. The sixth nozzle row KL3 and the ninth nozzle row KL5 correspond to a subordinate concept to the first nozzle row described in Summary. The eighth nozzle row KL4 and the eleventh nozzle row KL6 correspond to a subordinate concept to the third nozzle row described in Summary. The fifth nozzle row YL3 and the tenth nozzle row YL5 correspond to a subordinate concept to the second nozzle row described in Summary. The seventh nozzle row YL4 and the twelfth nozzle row YL6 correspond to a subordinate concept to the fourth nozzle row described in Summary. The first nozzle row CL1 and the second nozzle row ML1 correspond to a subordinate concept to the fifth nozzle row described in Summary. The third nozzle row CL2 and the fourth nozzle row ML2 correspond to a subordinate concept to the sixth nozzle row described in Summary.

In the printing apparatus 100 having the above-mentioned configuration according to the Second Exemplary Embodiment, the same effects as those in the First Exemplary Embodiment can be exerted. Additionally, in the printing chip overlapping area ChOAr2, the printing control unit 221 causes ink to be discharged so that the first black overlapping area KOAr1 and the first yellow overlapping area YOAr1 completely overlap with each other when viewed from the main scanning direction X, and also causes ink to be discharged so that the second black overlapping area KOAr2 and the second yellow overlapping area YOAr2 completely overlap with other when viewed from the main scanning direction X. Thus, as compared to the configuration in which ink is discharged so that the black overlapping areas KOAr1 and KOAr2 and the yellow overlapping areas YOAr1 and YOAr2 do not overlap with each other when viewed from the main scanning direction X, the overlapping areas COAr1, COAr2, MOAr1, and MOAr2 of the colors other than black and yellow, the black overlapping areas KOAr1 and KOAr2, and the yellow overlapping areas YOAr1 and YOAr2 can be arranged at the positions away from each other in the sub scanning direction Y. Further, there can be secured the area (nozzle group) in which the cyan overlapping areas COAr1 and COAr2 are arranged so as not to overlap with each other when viewed from the main scanning direction X and the area (nozzle group) in which the magenta overlapping areas MOAr1 and MOAr2 are arranged so as not to overlap with each other when viewed from the main scanning direction X. Additionally, the printing apparatus 100 can be reduced in size.

C. Other Exemplary Embodiments

C1. Exemplary Embodiment 1

In the above-mentioned First Exemplary Embodiment, the first overlapping area OAr1 and the second overlapping area OAr2 do not overlap with each other in the main scanning direction X. However, the invention is not limited thereto. For example, the first overlapping area OAr1 and the second overlapping area OAr2 may partially overlap with each other in the main scanning direction X. That is, the first overlapping area OAr1 and the second overlapping area OAr2 may be arranged so as not to at least partially overlap with each other in the main scanning direction X. Such configuration also exerts effects similar to those in the above-mentioned First Exemplary Embodiment.

C2. Exemplary Embodiment 2

In the above-mentioned Second Exemplary Embodiment, the first black overlapping area KOAr1 and the first yellow overlapping area YOAr1 completely overlap with each other when viewed from the main scanning direction X, and also the second black overlapping area KOAr2 and the second yellow overlapping area YOAr2 completely overlap with each other when viewed from the main scanning direction X. However, the invention is not limited this configuration. For example, the first black overlapping area KOAr1 and the first yellow overlapping area YOAr1 may partially overlap with each other when viewed from the main scanning direction X. Further, for example, the second black overlapping area KOAr2 and the second yellow overlapping area YOAr2 may partially overlap with each other when viewed from the main scanning direction X. Such configuration also exerts effects similar to those in the above-mentioned Second Exemplary Embodiment.

C3. Exemplary Embodiment 3

In each of the above-mentioned exemplary embodiments, the printing apparatus 100 is a serial ink jet-type printer. However, in place of a serial ink jet-type printer, a line printer for performing line printing may be used. Such configuration also exerts effects similar to those in the above-mentioned exemplary embodiments.

C4. Exemplary Embodiment 4

In each of the above-mentioned exemplary embodiments, the printing control unit 221 performs single pass printing in which a raster is completed by one main scanning of the printing head 400. In place of this, there may be performed a multi-pass printing in which rasters are completed by a plurality of times of main scanning of the printing head 400. Such configuration also exerts effects similar to those in the above-mentioned exemplary embodiments.

C5. Exemplary Embodiment 5

In the above-mentioned Second Exemplary Embodiment, in the configuration in which the printing head 400 further includes a nozzle row for discharging ink of light black and a nozzle row for discharging ink of much lighter black in addition to the nozzle rows KL3 to KL6 for discharging ink of black, ink of black and ink of much lighter black may be discharged so that the black overlapping area and a much lighter black overlapping area overlap or completely overlap with each other when viewed from the main scanning direction X. This is because as follows. That is, a large amount of ink of black and a large amount of ink of much lighter black are less liable to be discharged at the same time. Thus, in a case where landing position deviation of ink droplets is caused, landing position deviation is less liable to be caused at the same time in the black overlapping area and the lighter black overlapping area. Therefore, in the printing image, the printing image quality is less liable to be degraded. Such configuration also exerts effects similar to those in the above-mentioned Second Exemplary Embodiment.

C6. Exemplary Embodiment 6

In each of the above-mentioned exemplary embodiments, the printing control unit 221 generates the printing data. Instead, the printer driver incorporated in the printing control device 10 may generate the printing data. In this configuration, the printing control unit 221 can perform printing by controlling the conveyance motion of the medium P, the reciprocation operation of the carriage 500, and the discharge operation of the ink from the printing head 400, based on the printing data received from the printing control device 10. Such configuration also exerts effects similar to those in the above-mentioned exemplary embodiments.

C7. Exemplary Embodiment 7

In each of the above-mentioned exemplary embodiments, the first printing chip Ch1 and the second printing chip Ch2 partially overlap with each other when viewed from the main scanning direction X. However, the invention is not limited to this configuration. For example, the first printing chip Ch1 and the second printing chip Ch2 may entirely overlap with each other. In other words, in general, the first printing chip Ch1 and the second printing chip Ch2 may be arranged so as to at least partially overlap with each other when viewed from the main scanning direction X. Such configuration also exerts effects similar to those in the above-mentioned exemplary embodiments.

C8. Exemplary Embodiment 8

In each of the above-mentioned exemplary embodiments, other devices may have at least part of the functions of the printing apparatus 100. For example, the printing control device 10 may include the printing control unit 221. Further, the printing apparatus 100 may have all the functions of the printing control device 10. Such configuration can also exert effects similar to those in the above-mentioned exemplary embodiments.

C9. Exemplary Embodiment 9

In each of the above-mentioned exemplary embodiments, part of the configuration achieved by the hardware may be replaced with software. Alternatively, part of the configuration achieved by the software may be replaced with hardware. Further, in a case where part of the functions or the entire functions of the invention is achieved by the software, the software (computer program) may be provided in a form stored in a computer-readable recording medium. In the invention, "computer-readable recording medium" is not limited to a portable recording medium such as a flexible disk and a CD-ROM, but includes various internal storage devices such as a RAM and a ROM and various external storage devices fixed to a computer such as a hard disk. In other words, "computer-readable recording medium" has a broad range of definition including any recording device capable of non-transitorily and fixedly storing data.

The invention is not limited to the exemplary embodiments described above. Rather, the invention can be achieved in various configurations, to an extent that such configurations fall within the scope of the invention. For example, technical features of the exemplary embodiments, which correspond to the technical features of the embodiments described in the summary of the invention, may be appropriately replaced or combined to address some or all of the above-identified problems or to achieve some or all of the above-described advantages. When one of the technical features is not described as essential in the description, the one of the technical features may be appropriately deleted.

This application claims priority under 35 U.S.C. § 119 to Japanese Patent Application No. 2018-021538, filed Feb. 9, 2018. The entire disclosure of Japanese Patent Application No. 2018-021538 is hereby incorporated herein by reference.

What is claimed is:

1. A printing apparatus for performing printing on a medium, the printing apparatus comprising:
    a printing head including a first nozzle row, a second nozzle row, a third nozzle row, a fourth nozzle row, a fifth nozzle row, and a sixth nozzle row, which are arranged to at least partially overlap with each other when viewed from a second direction intersecting a first direction, the first nozzle row, the second nozzle row, the third nozzle row, the fourth nozzle row, the fifth nozzle row, and the sixth nozzle row including a plurality of nozzles arrayed in the first direction for discharging ink onto the medium;
    a conveyance unit configured to convey the medium relatively to the printing head; and
    a printing control unit configured to cause the printing head to discharge the ink onto the medium, wherein
    the first nozzle row and the second nozzle row are configured to discharge a first color ink,
    the third nozzle row and the fourth nozzle row are configured to discharge a second color ink,
    the fifth nozzle row and the sixth nozzle row are configured to discharge a third color ink, and
    the printing control unit is configured to cause the ink to be discharged so that a first distance is shorter than a second distance and the first distance is shorter than a third distance,
        the first distance is a distance between a center of a first overlapping area and a center of a second overlapping area in the first direction,
            the first overlapping area where both the first nozzle row and the second nozzle row discharge the ink when viewed from the second direction, and
            the second overlapping area where both the third nozzle row and the fourth nozzle row discharge the ink when viewed from the second direction,
        the second distance is a distance between a center of the first overlapping area and a center of a third overlapping area in the first direction,
            the third overlapping area where both the fifth nozzle row and the sixth nozzle row discharge the ink when viewed from the second direction, and
        the third distance is a distance between a center of the second overlapping area and a center of the third overlapping area in the first direction.

2. The printing apparatus according to claim 1, wherein, the first color ink is yellow ink,
    the second color ink is black ink, and
    the third color ink is a color which is neither black nor yellow.

3. The printing apparatus according to claim 2, wherein the printing head includes a seventh nozzle row and an eighth nozzle row including a plurality of nozzles arrayed in the first direction for discharging ink onto the medium,
    the seventh nozzle row is arranged to at least partially overlap with the first nozzle row through the sixth nozzle row when viewed from the second direction,
    the eighth nozzle row is arranged to at least partially overlap with the first nozzle row through the seventh nozzle row when viewed from the second direction,
    the seventh nozzle row and the eighth nozzle row are configured to discharge a fourth color ink which is neither black ink nor yellow ink nor the third color ink, and
    the printing control unit is configured to cause the ink to be discharged so that the second distance is shorter than a fourth distance and the third distance is shorter than the fourth distance,
        the fourth distance is a distance between a center of the third overlapping area and a center of the fourth overlapping area in the first direction, and
        the fourth overlapping area where both the seventh nozzle row and the eighth nozzle row discharge the ink when viewed from the second direction.

4. A printing method performed by a printing device including a printing head with a plurality of nozzles for discharging ink onto a medium,
    the printing head including a first nozzle row, a second nozzle row, a third nozzle row, a fourth nozzle row, a fifth nozzle row, and a sixth nozzle row which are arranged to at least partially overlap with each other when viewed from a second direction intersecting a first direction, the first nozzle row, the second nozzle row, the third nozzle row, the fourth nozzle row, the fifth nozzle row, and the sixth nozzle row including a plurality of nozzles arrayed in the first direction,
    the first nozzle row and the second nozzle row are configured to discharge a first color ink,
    the third nozzle row and the fourth nozzle row are configured to discharge a second color ink,
    the fifth nozzle row and the sixth nozzle row are configured to discharge a third color ink,
    the printing method comprising:
conveying the medium relatively to the printing head; and
causing the printing head to discharge the ink onto the medium, wherein
    the causing the printing head to discharge the ink onto the medium includes causing the ink to be discharged so that a first distance is shorter than a second distance and a third distance,
        the first distance is a distance between a center of a first overlapping area and a center of a second overlapping area in the first direction,
            the first overlapping area where both the first nozzle row and the second nozzle row discharge the ink when viewed from the second direction, and the second overlapping area where both the third nozzle row and the fourth nozzle row discharge the ink when viewed from the second direction, the second distance is a distance between a center of the first overlapping area and a center of a third overlapping area in the first direction, the third overlapping area where both the fifth nozzle row and the sixth nozzle row discharge the ink when viewed from the second direction, and the third distance is a distance between a center of the second overlapping area and a center of the third overlapping area in the first direction.

\* \* \* \* \*